United States Patent
Wright

[15] 3,687,976
[45] Aug. 29, 1972

[54] PROCESS FOR THE PREPARATION OF CYCLIC SULFIDES
[72] Inventor: Franklin J. Wright, Watchung, N.J.
[73] Assignee: Esso Research and Engineering Company
[22] Filed: Jan. 4, 1966
[21] Appl. No.: 518,704

[52] U.S. Cl........260/327 E, 260/329 HS, 260/593 R
[51] Int. Cl. .............................................C07d 59/00
[58] Field of Search................................260/327 EP

[56] References Cited

UNITED STATES PATENTS

| 3,073,846 | 1/1963 | Millikan | 260/327 |
| 3,213,108 | 10/1965 | Osborn et al. | 260/327 |
| 3,282,960 | 11/1966 | Broderick et al. | 260/327 |
| 3,357,991 | 12/1967 | Swakon | 260/327 |
| 3,426,039 | 2/1969 | Osborn et al. | 260/327 |

FOREIGN PATENTS OR APPLICATIONS 6,506,490  11/1965  Netherlands

Primary Examiner—Henry R. Jiles
Assistant Examiner—Cecilia M. Shurko
Attorney—Whelan, Chasan, Litton, Marx and Wright and F. A. Sinnock

[57] ABSTRACT

High initial selectivities along with good conversions to episulfides are obtained by reacting epoxides in the vapor phase with COS or $CS_2$ in the presence of a solid catalyst selected from the group consisting of calcium and barium oxides, hydroxides and cyanamides and sodium, potassium and lithium hydroxides and sulfides. The highly reactive olefin episulfides formed in accordance with the instant invention, e.g., ethylene episulfide, and propylene episulfide, are active ingredients in various insecticides and fungicides and readily form polymers having useful properties as plastics.

19 Claims, 2 Drawing Figures

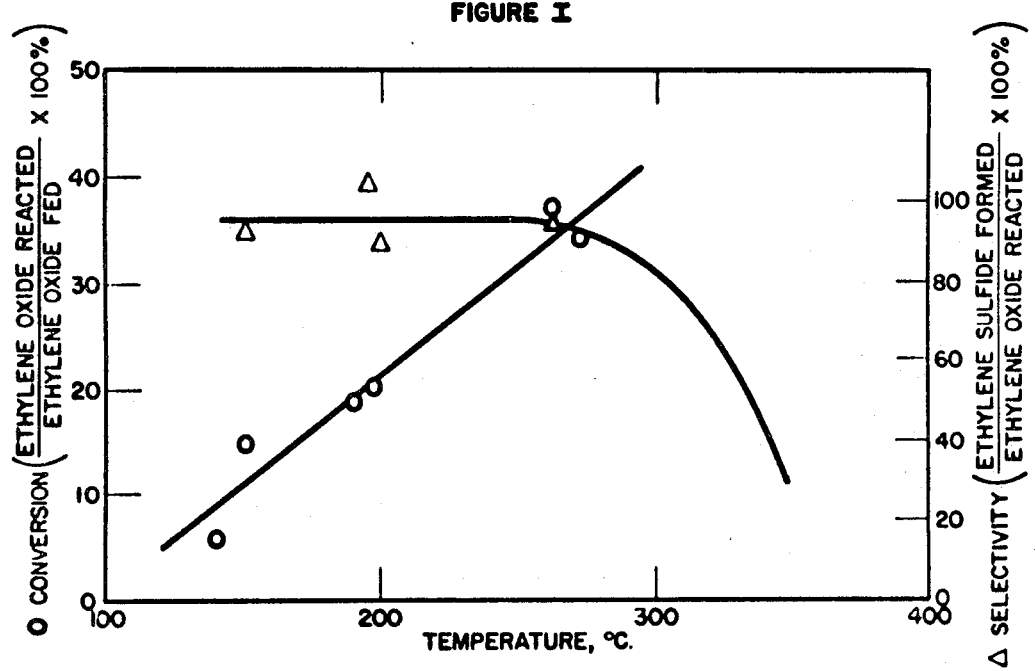
FIGURE I
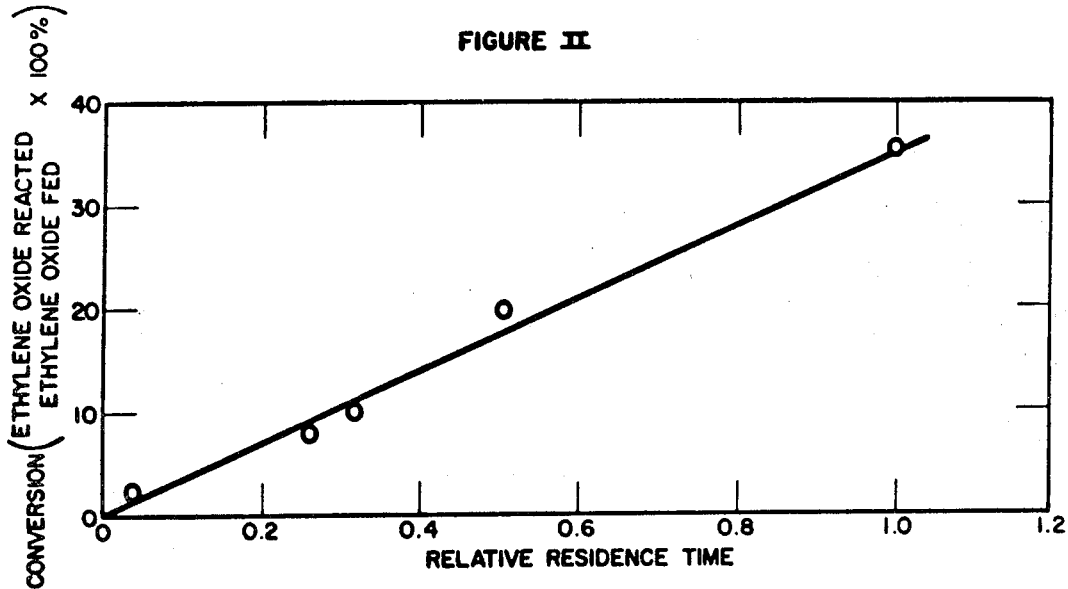
FIGURE II
FRANKLIN J. WRIGHT    INVENTOR
BY   Frank A. Dimock
PATENT ATTORNEY

PROCESS FOR THE PREPARATION OF CYCLIC SULFIDES

The present invention relates to an improved process for the economic synthesis of episulfides by reacting saturated or unsaturated epoxides in the vapor phase with COS or $CS_2$. More particularly this invention relates to obtaining extremely high initial selectivities, e.g., 60 to 90 percent along with good conversions, e.g., 40 percent specifically by carrying out the reaction in the presence of calcium or barium oxides, hydroxides and cyanamides or sodium, potassium or lithium hydroxides and sulfides. Most particularly, in a preferred embodiment this invention relates to carrying out the reaction at temperatures of 30°–400°C. in the presence of the following solid catalysts under anhydrous conditions: CaO, CaO on pumice, $Ca(OH)_2$, BaO, dolomitic lime, NaOH, LiOH on Wilson Carbon, soda lime, mixed sulfides of potassium on Wilson Carbon and calcium cyanamide.

Highly reactive olefin episulfides of the type of ethylene episulfide and propylene episulfide are clearly recognized to be potentially valuable chemical monomers useful for the preparation of various polymers and a variety of other uses. However, volume use of these materials has to the present awaited an economic method for their synthesis. Such an economic synthesis is provided by the present process.

The catalysts of the present invention and mixtures thereof may be used along or supported on standard supports such as asbestos, aluminas, activated carbon, etc. Preferably the supports, if used, are nonacidic or treated, e.g., with an aqueous base, to be nonacidic since cyclic sulfides dimerize to dithioane derivatives when heated with acidic catalysts. The form of the catalyst is preferably granular or pellets.

Suitable feed stocks for use in the present invention are unsaturated organic epoxide feeds, preferably gaseous feeds or feeds capable of being converted to a gas without decomposition as follows:

a. $C_2$ to $C_{12}$, preferably $C_2$ to $C_9$ branched and straight chain monoolefin epoxides including epoxides containing other functional groups such as aryl groups, carboxyl groups, chlorine, fluorine, etc., e.g., epoxides of the following: ethylene, propylene, isobutylene, 1-butene, 2-butene, 2-methyl-1-butene, pentenes, hexenes, heptenes, dodecenes, styrene, oleic acid, etc.

b. Same range for epoxides of cyclic monoolefins and substituted cyclic monoolefins, and alkyl, aryl, carboxyl, chlorine and fluorine substituted cyclic monoolefins, beginning with the $C_3$ ring, e.g., epoxides of cyclobutene, cyclopentene, cyclohexene, cycloheptene, cyclooctene, alkyl substituted derivatives thereof, cyclopentenoic acid, cyclohexenoic acid, cinnamic acid, etc.

c. Same range for branched and straight chain unconjugated diolefin epoxides beginning with $C_3$ (allene), e.g., epoxides of 1-4 pentadiene, 1-5 hexadiene, etc.

d. Same range for conjugated diolefin epoxides, branched and straight chain, and alkyl, aryl, carboxyl, chlorine and fluorine substituted conjugated diolefin epoxides beginning with $C_4$, e.g., epoxides of 1-3 butadiene, isoprene, chloroprene, etc.

e. Same range for conjugated and unconjugated cyclic diolefin epoxides and alkyl, aryl, carboxyl, chlorine and fluorine substituted cyclic diolefin epoxides beginning with the $C_4$ ring, e.g., epoxides of cyclobutadienes, cyclopentadienes, cyclohexadienes, cyclohexadienoic acids, cycloheptadienes and cyclooctadienes.

f. Same range for noncyclic and cyclic triolefin epoxides and substituted triolefin epoxides including as substituents alkyl groups, aryl groups, carboxyl groups, chlorine, fluorine, etc. beginning with $C_6$, e.g., epoxides of cycloheptatrienes, cyclooctatrienes, 1,3,5-hexatriene, heptatrienes, etc.

g. Same range for epoxides of other nonhydrocarbon feeds including fatty acids, furan, thiophene, 1,4-pyrone, alkyl-and aryl-substituted thiophenes, unsaturated alcohols, e.g., epoxides of allyl alcohol, etc.

The present invention may be carried out under the following preferred conditions:

1. Temperatures in the range of 0° to 500°C., preferably 30° to 400°C., more preferably 100°–300°C., e.g., 250°C.
2. Pressures in the range of 0.1 to 50 atmospheres, preferably 1 to 5 atmospheres, e.g., 1 atmosphere.
3. Mole ratios of COS or $CS_2$ to epoxide in the range of 1/10 to 1000/1, preferably 0.5/1 to 100/1, more preferably 1/1 to 10/1.
4. Reaction times in the range of 0.1 second to 1 hour, preferably 0.1 minute to 0.25 hour, more preferably 10 seconds to 5 minutes.
5. Flow rates per weight of catalyst 0.1 to 500, preferably 1 to 100 micromoles of olefin (including diolefins, etc.) epoxide converted per gram of catalyst per minute.

In a preferred embodiment, the reaction is carried out in a flow reactor having an L/D of 3:1 to 25:1 at reaction times of 5 seconds to 10 minutes. Also, in a preferred embodiment, conditions are utilized to obtain high conversions per pass of 50 to 95 percent and the desired products, e.g., episulfides are removed from the product by absorption, extraction, etc. The remaining reaction products are recycled to extinction to thereby obtain high overall conversions and yields.

The present invention will be more clearly understood from a consideration of the following examples.

EXAMPLE 1—CATALYST SCREENING—COS

Propylene oxide and carbonyl sulfide were separately introduced through rotometers into a stainless steel reactor (8 inch length by ½-inch diameter) contained in a furnace. The laboratory equipment was valved so as to permit mass chromatographic sampling of both the entering and product gases from the reactor. The flow rates of propylene oxide and COS were each 150 cc/min. and the reactor was packed with catalyst and held at 200°C. and approximately atmospheric pressure. The following screening results were obtained with a number of catalysts.

| Catalyst | Selectivity Mols Episulfide or Acetone Formed Per Mol of Epoxide Reacted | Yield Mols Episulfide or Acetone Formed Per Mol of Epoxide Fed |
|---|---|---|
| Tricalcium Phosphate | Very small yields | Episulfide |

| Catalyst | Selectivity | Yield | Product |
|---|---|---|---|
| 0.05% Pt. on Silicon Carbide | Very small yields | | Episulfide |
| Soda Lime 8 mesh | 60% / 15% | 8% / 2% | Episulfide / Acetone |
| NaOH | 65% / 25% | 6% / 2% | Episulfide / Acetone |
| Silica Gel | Very small yields | | Episulfide |
| $Na_2HPO_4$ on Wilson Carbon | Insignificant yields | | Episulfide |
| Mixed Sulfides of Pt. on Wilson Carbon | 64% / 35% | 35% / 17% | Episulfide / Acetone |
| LiOH on Wilson Carbon | 70% / 26% | 3% / 1% | Episulfide / Acetone |
| CaO | 71% | 6% | Episulfide No other prod. Observed |
| Vanadium Pentoxide on Wilson Carbon | Very small yields | | Episulfide |
| 5% $H_3PO_4$ on Wilson Carbon | Very small yields | | Episulfide |
| BaO | 63% / 12% | 12% / 2% | Episulfide / Acetone |
| Magnesium O-phosphate on Wilson Carbon | Very small yields | | Episulfide |
| Molybdic Anhydride on Wilson Carbon | No | No | Episulfide |
| $KBF_4$ on Wilson Carbon | No | No | Episulfide |
| Ferric Phosphate on Wilson Carbon | No | No | Episulfide |
| $Na_2HPO_4$ on Wilson Carbon | Very Small Yields | | Episulfide |
| $Ag_2S$ | Very Small Yields | | Episulfide |
| ZnO on Wilson Carbon | No | No | Episulfide |
| CuS on Wilson Carbon | No | No | Episulfide |
| CaS | 3% | 1% | Episulfide |
| CuO | No | No | Episulfide |

This example shows that CaO, the preferred catalyst, gives high selectivities to episulfide with little or no undesirable isomerization of epoxide to acetone. Somewhat less preferred are soda lime, NaOH, mixed sulfides of potassium on Wilson Carbon, LiOH on Wilson Carbon, BaO and Ca NCN. This example also illustrates the large number of catalysts which are ineffective in the present process.

EXAMPLE 2—CATALYST SCREENING—$CS_2$

Propylene oxide and carbon disulfide supplied at flow rates of 20 cc/min. and 20 cc/min., respectively, were reacted in the equipment described in Example 1 at 200°C. and atmospheric pressure in the presence of various catalysts as described below.

| Catalyst | Selectivity (Mols, episulfide formed per mol of propylene oxide reacted) | Yield (Mols, episulfide formed per mol of propylene oxide) |
|---|---|---|
| CaO | 80 % | 22 % |
| Calcium Cyanamide | 25 % | 16 % |
| Dolomitic Lime (CaO.MgO) | 25 % | 12 % |
| $ZnO_2$ Pellets | v. small not calc.* | |
| Eta-alumina | v. small not calc.* | |
| $ZnO_2$ | v. small not calc.* | |
| Mixed sulfides of Potassium on Wilson Carbon | 64 % / 31 % (acetone) / 71 %* | 45 % / 15 % (acetone) / 71 %* |

*Ethylene Oxide, 250° C.

This example shows that CaO and mixed sulfides of potassium on Wilson Carbon give best selectivies to episulfide. Less preferred catalysts are mixed sulfides of potassium and dolomitic lime. The remaining catalysts are essentially ineffective in the present process.

EXAMPLE 3—REACTION CONDITION PARAMETERS WITH CaO CATALYST

The same equipment employed in Example 1 was used to determine the influence of certain reaction parameters, i.e., temperature and residence time at atmospheric pressure on the conversion (oxide reacted/oxide feed) and selectivity (sulfide formed/oxide reacted) obtained with CaO as the catalyst. Results obtained are shown in the accompanying drawing, FIG. I, showing the conversion and selectivity obtained at varying temperatures (mixture 20 cc/min. COS and 20 cc/min. ethylene oxide supplied) and FIG. II describing the conversion obtained at a constant temperature, i.e., 275°C. with varying residence time (mixture 28 cc/min. COS and 34 cc/min. ethylene oxide supplied, residence time varied by dilution with Helium, Rel. Residence Time 1.0 is 28 seconds.

Referring to FIG. I, it can be seen that extremely high selectivities are obtained up to a temperature of about 300°C. where the epoxide formed begins to be thermally decomposed. It should also be noted that high conversions in the order of 35 percent may be obtained. Similarly, in FIG. II it can be seen that at constant temperature, similar increase in conversion can be obtained with increasing residence time. It is noted that further confirmation that little, if any, high boiling materials was formed in the above described reactions as shown by the fact that a freon tracer employed in the equipment revealed that a volume decrease of only about 3 percent occurred in the course of the reaction.

EXAMPLE 4—EFFECT OF COS/ETHYLENE OXIDE RATIO

Carbonyl sulfide and ethylene oxide were reacted over CaO catalyst at 262°C. in the reaction equipment described in Example 1. Ratios of COS to ethylene oxide were varied as described below, flow rates in all cases (total flow) being 73 cc/min. (22 seconds residence time).

| Ratio COS/Ethylene Oxide | Episulfide Selectivity | Yield |
|---|---|---|
| 9.1 | 78% | 16% |
| 1.2 | 81% | 17% |
| 0.78 | 85% | 21% |
| 0.53 | 75% | 18% |

This example demonstrates that high selectivities and yields can be obtained over a wide range of reactant ratios.

EXAMPLE 5—COS WITH PROPYLENE AND ETHYLENE OXIDES

Calcium oxide was employed as the catalyst and COS as the source of sulfur. In experiments conducted with both propylene oxide and ethylene oxide both materials were found to be converted to the corresponding episulfide with a selectivity of the order of 95 percent. At 250°C. and atmospheric pressure using a stainless steel reactor (½ -inch I.D., 12 inches long) and a residence time of the order of 10 seconds the conversion per pass was 35–40 percent.

EXAMPLE 6—$CS_2$ WITH PROPYLENE AND ETHYLENE OXIDES

In similar experiments to those conducted in Example 3, it was found that $CS_2$ could be substituted for COS. Analysis of the product trapped at −10°C. showed that conversions of the order of 40 percent could be obtained with selectivities of the order of 90 percent based upon both the epoxide and $CS_2$. Examination of the CaO at the completion of a run showed that apart from a slight discoloration, the material retained its fresh appearance. It is noted that in all of the above examples, in which calcium oxide was used, the material was calcined in a stream of nitrogen prior to such use.

EXAMPLE 7

In experiments similar to those disclosed in Example 3, butadiene oxide was used as the epoxide, $CS_2$ as the source of sulfur and calcium oxide as the catalyst, it was found that butadiene episulfide, i.e., the unsaturated episulfide was obtained with good selectivity and yield.

EXAMPLE 8—COS REACTED WITH PROPYLENE OXIDE OVER CaO—LIFE TEST

A 24-inch by 1-inch (ID) stainless steel reactor was packed with CaO catalyst (4–8 mesh calcined at 670°C. for 2 hours). COS and propylene oxide (1.8 mols COS/1 mol propylene oxide) were reacted at 253°C. and atmospheric pressure at 0.29 throughput [gms ($C_3O$ + COS)/vol. of reactor (cc)/hour] and 24 seconds contact time to obtain: (a) during the period 310–370 minutes from startup with fresh catalyst 71 percent selectivity and 12 percent conversion to episulfides based on propylene oxide, and (b) during the period 430–490 minutes from startup 48 percent selectivity and 13 percent conversion to episulfides based on propylene oxide.

This example shows that good selectivities and conversions can also be obtained using COS as the reactant for a considerable period before catalyst deactivation.

EXAMPLE 9—$CS_2$ REACTED WITH PROPYLENE OXIDE OVER CaO—LIFE TEST

The following experiment was conducted at atmospheric pressure in a 30.5 cm by 3 cm (ID) glass reactor packed with 4–8 mesh calcium oxide (Fisher Certified Reagent grade calcined at 700°C. for 17 hours in dry helium). Propylene oxide and carbon disulfide were supplied from bubblers at temperatures and helium rates to provide the indicated mol ratios of reactants (22 cc total helium per minute at 24°C.)

| Sample Period Minutes | 30–60 | 90–120 | 120–180 | 250–280 |
|---|---|---|---|---|
| Reactant Feed Rate cc/hr. | 18.4 | 18.4 | 18.4 | 14 |
| React. Temp., °C. | 280 | 280 | 280 | 300 |
| Mol Ratio Reactants $CS_2/C_3O$ | 1/9 | 1/2.7 | 1/2.7 | 1/2.3 |
| Conversion $C_3O$, % | ≈6 | 2–5 | 2–5 | 2–5 |
| Sel. $C_3S$, wt.% | 50 | 33 | 24 | 10 |
| Color of Liquid Prod. | Water White | Very pale yellow | | Yellow |

This experiment shows that the catalyst deactivates as the reaction continues. Analysis of fresh catalyst vs used catalyst reveals an increase in carbon and sulfur levels indicating minor conversion of the CaO to CaS and $CaCO_3$ (the latter being poor catalysts).

EXAMPLE 10—$CS_2$ REACTED WITH PROPYLENE OXIDE OVER Ca(OH)$_2$

A pyrex glass reactor 12½ inches by 1 inch ID was filled with Fisher Certified Reagent Grade $Ca(OH)_2$. $CS_2$ and propylene oxide in a mol ratio of 1/1 were reacted at 200°C. at atmospheric pressure with a liquid hydrocarbon space velocity of 0.5. Conversion was found to be 11 percent, selectivity 52 percent and yield 7 percent (all mol percent based on propylene oxide). This example shows that $Ca(OH)_2$ is also a good catalyst.

What is claimed is:

1. A process for the direct formation of episulfides which consists essentially of reacting an epoxide at a temperature in the range of from about 30° to 400°C. with a sulfur compound selected from the group consisting of COS and $CS_2$ in the vapor state over a solid catalyst selected from the group consisting of calcium hydroxide, mixed sulfides of potassium on Wilson carbon, sodium hydroxide, soda lime, and calcium cyanamide for a period of time in the range of from about 0.1 second to 1 hour and recovering a reaction product comprising episulfides.

2. The process of claim 1 in which the sulfur compound is COS and the reaction temperature is in the range of between about 100° and 300°C.

3. The process of claim 1 in which the sulfur compound is $CS_2$ and the reaction temperature is in the range of between about 100° to 300°C.

4. The process of claim 1 in which the catalyst is $Ca(OH)_2$.

5. The process of claim 1 in which the catalyst is mixed sulfides of potassium on Wilson carbon.

6. The process of claim 1 in which the catalyst is NaOH.

7. The process of claim 1 in which the catalyst is soda lime.

8. The process of claim 1 in which the catalyst is calcium cyanamide.

9. A vapor phase process for the selective formation of episulfides which comprises reacting an epoxide with a sulfur compound selected from the group consisting of COS and $CS_2$ at a temperature in the range of from about 100° to 300°C. in the presence of a calcium oxide catalyst and recovering episulfides with a selectivity to episulfides of at least 70 mole percent.

10. The process of claim 9 in which the epoxide is selected from the group consisting of ethylene oxide and propylene oxide.

11. A process for the synthesis of episulfides which comprises reacting an epoxide at a temperature in the range of from about 30° to 400°C. with a sulfur compound selected from the group consisting of COS and $CS_2$ in the vapor state over a catalyst selected from the group consisting of calcium and barium hydroxides and cyanamides and sodium, potassium and lithium hydroxides and sulfides for a period of time in the range of from about 0.1 second to 1 hour and recovering a reaction product comprising episulfides.

12. A process for the production of a vicinal episulfide which comprises reacting an alkylene oxide with a sulfur-donor compound selected from the group consisting of carbonyl sulfide, and a carbon disulfide at a temperature in the range of from about 100°C. to about 300°C. in the presence of a catalystic amount of at least one unsupported oxide catalyst selected from the group consisting of calcium oxide and barium oxide, using pressures such that the reaction is carried out at a space velocity in the range of from about 4 to about 600 hours $^{-1}$, thereby forming a vicinal episulfide corresponding to the alkylene oxide.

13. The process according to claim 12, in which the sulfur-donor is carbonyl sulfide.

14. The process according to claim 12, in which the sulfur-donor is carbon disulfide.

15. The process according to claim 12, in which the reaction occurs in the vapor phase.

16. The process according to claim 12, in which the oxide catalyst is calcium oxide.

17. The process according to claim 12, in which the oxide catalyst is barium oxide.

18. The process according to claim 12, in which the alkylene oxide is ethylene oxide.

19. The process according to claim 12, in which the alkylene oxide is propylene oxide.

* * * * *